United States Patent Office 2,798,798
Patented July 9, 1957

2,798,798

FUEL OIL COMPOSITIONS

Byron E. Marsh, Brookfield, and Elliot N. Schubert, Richard L. Betcher, and Paul L. Du Brow, Chicago, Ill., assignors to Armour and Company, Chicago, Ill., a corporation of Illinois No Drawing. Application October 3, 1955,
Serial No. 538,256

10 Claims. (Cl. 44—73)

This invention relates to improved fuel oil compositions.

It is well known that hydrocarbon fuel oils, such as those used in burner systems, diesel and combustion engines and other industrial and domestic equipment, are per se subject to numerous shortcomings due to chemical deterioration and impurities, either introduced or not removed in processing. This is particularly true of fuel oils which contain a substantial quantity of cracked components. For example, the oils tend in the presence of water to become corrosive to metallic surfaces after short periods of storage or exposure to the atmosphere. Many oils tend to develop undesirable solids or sludge which deleteriously affect the usefulness of the oils, either by diminution of their combustive capacity or by their tendency to clog the filters present in the equipment being employed. The petroleum industry has attacked the problem of improving fuel oil compositions from several angles. One is improved processing techniques; another is blending of oils; still a third, which is somewhat akin to the second, is the addition of chemical agents.

The quest by the petroleum industry for chemical additives for fuel oils to improve their properties has been and continues to be a tedious and not too rewarding proposition. Part of the reason for this is the multitude of functions which an additive must serve. Besides being compatible with the oil, an additive should, in order of desirability and importance, (1) improve the filterability of the oil; (2) inhibit the formation of sludge; (3) stabilize the color of the oil; (4) inhibit corrosion; and (5) prevent emulsification of any water which may be present in the oil. The job of finding an additive agent which will perform all of the aforementioned functions is like looking for a needle in a haystack. There seems to be no way of predicting that a given chemical will or should perform as desired. That is, it cannot be predicted that a chemical known to be a good corrosion inhibitor will also inhibit the formation of sludge, or vice versa. One solution might be to employ a mixture of additive agents, each for its own particular function. However, this is no simple matter when the problems of chemical and physical compatibilities and the multiplicity of functions are considered.

In accordance with the present invention, we have discovered a class of chemical compounds the members of which perform the above-mentioned functions in a combined degree heretofore unobtainable by previously known fuel oil additives.

It is, therefore, an object of this invention to provide improved fuel oil compositions.

The chemical compounds which can be used as additives in accordance with the present invention are described generally as dialiphatic-beta-amino propionaldehydes and can be represented by the general formula $R_2NCH_2C(R')_2CHO$ wherein R is an aliphatic radical having from 1 to 22 carbon atoms, at least one R being an aliphatic hydrocarbon radical having from 8 to 22 carbon atoms and preferably two; and wherein R' is selected from a group consisting of H and lower alkyl radicals having from 1 to 4 carbon atoms. Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, and mixtures of hydrocarbon radicals as derived from tall oil, tallow, soybean oil, coconut oil, cottonseed oil, and other animal and vegetable oils. Examples of radicals coming within the definition of R' include methyl, ethyl, propyl, isopropyl, butyl, and isobutyl. Our preferred compounds are alpha-dimethyl-beta-dicocoamino propionaldehyde and the corresponding di-tallow derivative.

The above basic compounds can be prepared by a type of Mannich reaction which involves reacting a secondary amine having at least one long hydrocarbon chain with formaldehyde and a lower alkyl aldehyde. The reaction can be illustrated by the following equation:

$$R_2NH + CH_2O + HC(R')_2CHO \rightarrow R_2NCH_2C(R')_2CHO + H_2O$$

wherein R and R' are the same as hereinbefore defined with the same limitations applying.

In carrying out this reaction, formaldehyde as an aqueous solution (formalin) is added over a period of about 15 minutes at a temperature of about 50° C. to the secondary amine which is dissolved in a suitable solvent, such as 3A alcohol. The lower alkyl aldehyde is then added and the mixture refluxed for about an hour, after which cooling and settling is allowed to take place. The aqueous alcohol layer is then separated from the product layer and the latter heated at reduced pressure for several hours to remove volatile impurities. The product can then be used as the additive for fuel oils.

Salts of our dialiphatic-beta-amino-propionaldehydes with acids such as oleic acid and other fatty acids, naphthenic acids, sulfonic acids, phosphorous acids, and the like, may also be employed as fuel oil additives. However, our own experience has indicated that the salts are generally inferior to the primary compounds themselves.

The hydrocarbon distillate fuel oils in which the active chemical ingredient of this invention are dispersed or dissolved can be treated or untreated cracked fuel oils or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in the compositions of this invention are cracked gas oils, fuel oils, furnace oils, burner oils, diesel fuel oils, kerosene, etc., and mixtures of said cracked fuels with the corresponding or like straight run hydrocarbon fractions.

The quantity of the chemical which can be added to the fuel oil in accordance with the present invention can vary within wide limits, depending upon the nature of the oil, especially those containing a substantial quantity of cracked components, and the use to which it is to be put. While the concentration of the added chemical can be as low as about 25 parts per million and as high as 1 or 2 weight percent, we prefer, in the case of a domestic fuel oil containing a substantial quantity of cracked components to add between about 50 and about 100 parts per million of chemical additive. Our chemical additives are, in general, liquids and oil-soluble and can be dissolved to provide the desired concentration of additive in the resulting fuel oil.

The following example will help to illustrate the underlying principles of our invention and is not intended to be unduly limiting thereof:

EXAMPLE

Several domestic furnace oils obtained from different companies and made up either completely of catalytically cracked stock or blends of 50% catalytically cracked stock and 50% of (corresponding) straight run distillate were tested for filterability, inhibition of sludge formation, color and emulsification properties. A control and two test samples containing 50 and 100 parts per million of alpha-dimethyl-beta-dicocoaminopropionaldehyde of each oil were tested. The samples were stored in vented containers protected from light at 110° F. for a period of thirteen weeks.

Filterability was determined by measuring the time necessary for 500 cc. of the test sample to flow through a one square centimeter area of 400 mesh screen while maintaining a 12 inch constant head of oil. The results of this test are set forth in Table I.

Table I

[Sources of oil—Company A and Company C]

| Nature of Sample | Amount of Additive (p. p. m.) | Flow Time In Seconds |
|---|---|---|
| 100% cat. cracked | (A) | 0 | Plugged. |
| Do | (A) | 50 | 80. |
| Do | (A) | 100 | 105. |
| 50-50 blend | (A) | 0 | 130. |
| Do | (A) | 50 | 52. |
| Do | (A) | 100 | 60. |
| 100% cat. cracked | (C) | 0 | Plugged. |
| Do | (C) | 50 | 78. |
| Do | (C) | 100 | 76. |
| 50-50 blend | (C) | 0 | 72. |
| Do | (C) | 50 | 57. |
| Do | (C) | 100 | 55. |

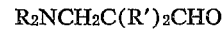

The amount of insoluble sludge in each of the samples was determined by filtering 400 cc. of each sample through F frit sintered glass Gooch crucibles and rinsing the crucibles and bottles free of fuel oil with mineral spirits. The crucibles and bottles were then washed again with a 50-50 mixture of acetone and methyl alcohol to dissolve the insoluble gum and this filtrate was collected in a 100 cc. tared moisture dish and the solvent evaporated. The gum plus the dried dish were dried to constant weight at 240° F. in an air-circulating oven and the weight of the gum determined. The results of this test are set forth in Table II.

Table II

[Sources of oil—Company A and Company C]

| Nature of Sample | Amount of Additive (p. p. m.) | Mg. of Gum/life |
|---|---|---|
| 100% cat. cracked | (A) | 0 | 98.0 |
| Do | (A) | 50 | 38.0 |
| Do | (A) | 100 | 18.0 |
| 50-50 blend | (A) | 0 | 37.0 |
| Do | (A) | 50 | 8.0 |
| Do | (A) | 100 | 5.0 |
| 100% cat. cracked | (C) | 0 | 54.0 |
| Do | (C) | 50 | 9.0 |
| Do | (C) | 100 | 3.5 |
| 50-50 blend | (C) | 0 | 18.0 |
| Do | (C) | 50 | 5.0 |
| Do | (C) | 100 | 3.0 |

Both the initial and final color of the test samples was determined with a National Petroleum Association (NPA) color wheel used in a Hellige Comparator. The results of these tests is set forth in Table III.

Table III

[Sources of oil—Company A and Company C]

| Nature of Sample | | Amount of Additive (p. p. m.) | Initial Color | Final Color |
|---|---|---|---|---|
| 100% cat. cracked | (A) | 0 | 1½ | 3 |
| Do | (A) | 50 | 1½ | 3— |
| Do | (A) | 100 | 1½ | 3— |
| 50-50 blend | (A) | 0 | 1 | 2 |
| Do | (A) | 50 | 1 | 2— |
| Do | (A) | 100 | 1 | 2— |
| 100% cat. cracked | (C) | 0 | 1½ | 4— |
| Do | (C) | 50 | 1½ | 3— |
| Do | (C) | 100 | 1½ | 2½ |
| 50-50 blend | (C) | 0 | 1 | 3— |
| Do | (C) | 50 | 1 | 2— |
| Do | (C) | 100 | 1 | 2— |

The emulsification characteristics of the test samples was determined by putting 20 cc. of distilled water and 80 cc. of the oil in a graduated cylinder stoppering the same and inverting it about 15 times to form an emulsion, and measuring the time necessary for the emulsion to break to a 2 cc. interface. An oil is acceptable in this respect if the time required for such a break is less than 4½ minutes, good if the time is between 1½ and 2½ minutes and excellent if the time is less than 1½ minutes. All of the test samples containing the additive had excellent emulsification properties.

While this invention has been described and exemplified in terms of its preferred embodiments, those skilled in the art will appreciate that variations can be made without departing from the spirit and scope of the invention.

We claim:

1. An improved fuel oil containing as an additive a minor amount, between about 0.0025 and about 2 weight percent, of a compound having the formula $$R_2NCH_2C(R')_2CHO$$

wherein R is an aliphatic hydrocarbon radical having from 1 to 22 carbon atoms, at least one R being an aliphatic hydrocarbon radical having from 8 to 22 carbon atoms, and R' is selected from the group consisting of H and lower alkyl radicals having from 1 to 4 carbon atoms.

2. An improved fuel oil according to claim 1 wherein both R's are aliphatic hydrocarbon radicals having from 8 to 22 carbon atoms and both R's are lower alkyl radicals having from 1 to 4 carbon atoms.

3. An improved fuel oil containing as an additive a minor amount, between about 0.0025 and about 2 weight percent, of alpha-dimethyl-beta-dicocoaminopropionaldehyde.

4. An improved fuel oil containing as an additive a minor amount, between about 0.0025 and about 2 weight percent, of alpha-dimethyl-beta-ditallowaminopropionaldehyde.

5. A domestic furnace oil having present therein a substantial quantity of cracked components and containing a minor amount, between about 0.0025 and about 2 weight percent, of a compound having the formula $$R_2NCH_2C(R')_2CHO$$

wherein R is an aliphatic hydrocarbon radical having from 1 to 22 carbon atoms, at least one R being an aliphatic hydrocarbon radical having from 8 to 22 carbon atoms, and R' is selected from the group consisting of H and lower alkyl radicals having from 1 to 4 carbon atoms.

6. A domestic furnace oil according to claim 5 wherein both R's are aliphatic hydrocarbon radicals having from 8 to 22 carbon atoms and both R's are lower alkyl radicals having from 1 to 4 carbon atoms.

7. A domestic furnace oil having present therein a substantial quantity of cracked components and containing a minor amount, between about 0.0025 and about 2 weight percent, of alpha-dimethyl-beta-dicocoaminopropionaldehyde.

8. A domestic furnace oil having present therein a substantial quantity of cracked components and containing a minor amount, between about 0.0025 and about 2 weight percent, of alpha-dimethyl-beta-ditallowaminopropionaldehyde.

9. A domestic furnace oil according to claim 7 wherein about 50 to 100 parts per million of chemical additive is present therein.

10. A domestic furnace oil according to claim 8 wherein about 50 to 100 parts per million of chemical additive is present therein.

References Cited in the file of this patent

UNITED STATES PATENTS 2,560,633    Stedman _____ July 17, 1951

FOREIGN PATENTS 269,840    Great Britain _____ Jan. 9, 1928